United States Patent [19]

Viall, Sr. et al.

[11] 4,105,237

[45] Aug. 8, 1978

[54] VEHICLE SAFETY BRAKING SYSTEM

[76] Inventors: Charles S. Viall, Sr., 1150D S. State College Blvd., Anaheim, Calif. 92806; Charles S. Viall, Jr., 3401 Gaviota, Long Beach, Calif. 90008; Harold S. Viall, 938 S. Chancer, Anaheim, Calif. 92806

[21] Appl. No.: 646,287

[22] Filed: Jan. 2, 1976

[51] Int. Cl.² .................................................. B60R 19/02
[52] U.S. Cl. ........................................ 293/73; 180/92; 180/94; 293/2; 293/5; 298/1 R; 340/61
[58] Field of Search ............... 293/2, 4, 5, 60, 63, 293/64, 66, 73, 74, 80; 180/82 R, 91, 92, 94, 96; 298/1 R, 17 R, 17 S, 19 V; 340/61; 200/DIG. 10

[56] References Cited

U.S. PATENT DOCUMENTS

| 1,579,928 | 4/1926 | Groesbeck | 340/61 |
|---|---|---|---|
| 1,625,505 | 4/1927 | Stump et al. | 200/61.44 |
| 1,699,271 | 1/1929 | Balogh | 180/92 |
| 2,444,635 | 7/1948 | Dennis, Jr. | 340/61 |
| 2,522,129 | 9/1950 | Mahring | 180/82 R |
| 2,567,443 | 9/1951 | O'Meara | 340/61 |
| 2,588,815 | 3/1952 | Fasolino | 180/82 R |
| 2,720,275 | 10/1955 | Thayer | 180/92 |
| 2,990,212 | 6/1961 | Nicastro | 293/73 X |
| 3,012,225 | 12/1961 | Holt et al. | 340/61 |
| 3,059,716 | 10/1962 | Iserman et al. | 180/92 X |
| 3,210,110 | 10/1965 | Chieger | 293/87 X |
| 3,370,878 | 2/1968 | Carr | 293/73 X |
| 3,409,874 | 11/1968 | Bowler et al. | 340/61 |
| 3,421,793 | 1/1969 | Pioch | 298/17 S |
| 3,510,837 | 5/1970 | Lepore et al. | 340/61 |
| 3,709,542 | 1/1973 | Fehlau et al. | 293/73 |
| 3,810,087 | 5/1974 | Suzuki | 180/82 R X |
| 3,923,330 | 12/1975 | Viall, Sr. et al. | 293/4 |
| 3,942,603 | 3/1976 | Pesonen | 180/92 |
| 3,986,577 | 10/1976 | Ebbesson | 180/92 |

FOREIGN PATENT DOCUMENTS 836,126 6/1960 United Kingdom ............... 340/61

Primary Examiner—Stephen G. Kunin
Assistant Examiner—Sherman D. Basinger
Attorney, Agent, or Firm—Gausewitz, Carr & Rothenberg

[57] ABSTRACT

This invention provides a safety arrangement for a dumping vehicle which may include a bumper movable to energize a brake actuator, the bumping being retractable upon tilting of the dumping bed. Modified bumper mounting arrangements are provided for various kinds of vehicles. A latching relay may be included to cause the brake actuator to hold the brakes locked, irrespective of disengagement of the obstruction. The bumper may include a pneumatic chamber with a flexible wall, with a pressure-operated switch for operating the brake actuator. Also, an exteriorly actuated switch may be used in a two-man operation in lieu of a bumper.

14 Claims, 10 Drawing Figures

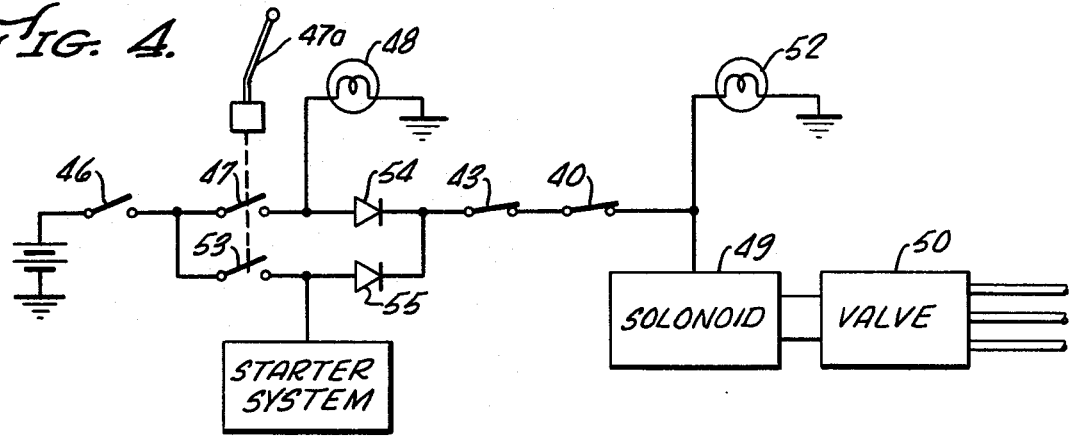
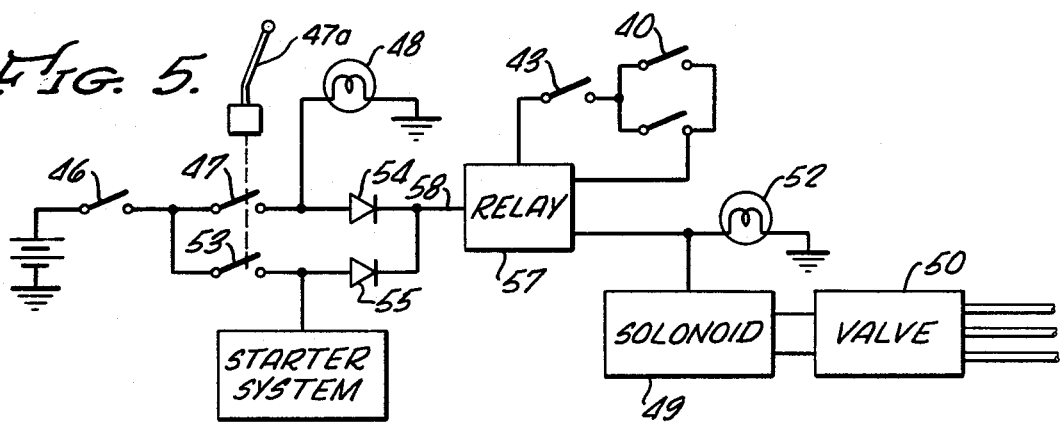
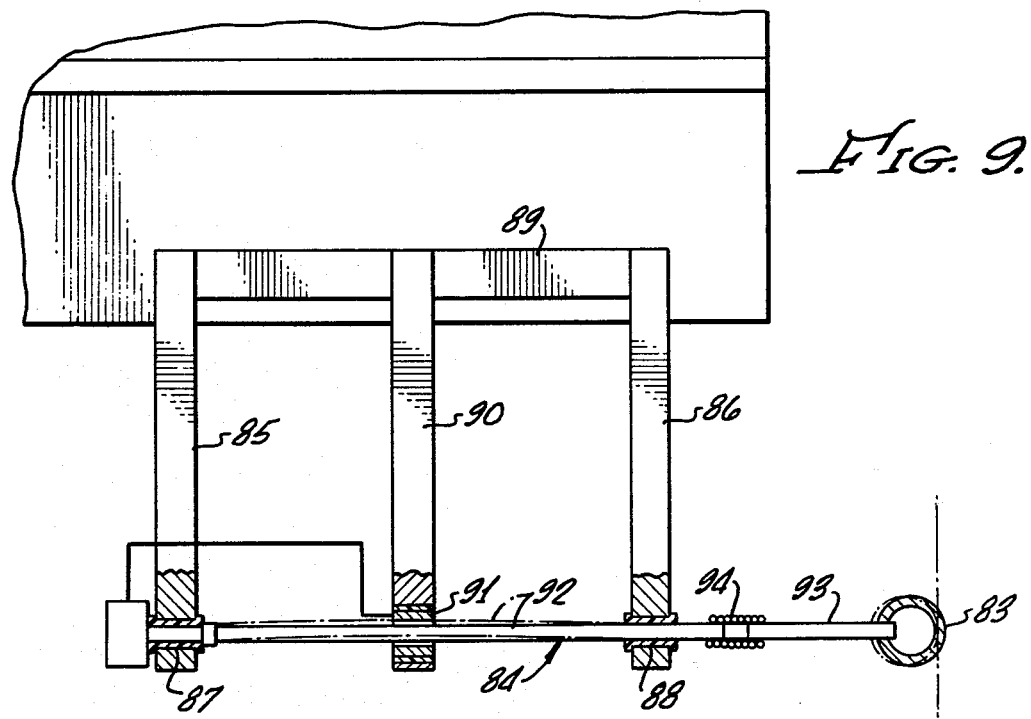

VEHICLE SAFETY BRAKING SYSTEM

BACKGROUND OF THE INVENTION

1. Field of the Invention

This invention relates to a safety braking system.

2. Description of the Prior Art

Safety systems for vehicles sometimes have employed bumper elements for engaging an obstruction, frequently resulting in the sounding of the horn or other audible warning. This has obvious shortcomings in that it relies upon the reaction of the operation of the vehicle to the warning signal for the application of the brakes. In U.S. Pat. Nos. 3,510,837 and in 3,923,330, the bumper element includes a means for applying the brakes of the vehicle when an obstruction is encountered. Only the latter system is adaptable for a dump truck where it is necessary to avoid engagement with the rear wheels of the vehicle or the supporting surface beneath it when the bed of the truck is tilted. However, in that design the bumper mechanism merely bends and does not retract so that some portions of it can continue to extend downwardly at the rearward end of the truck.

None of the prior designs includes a means for continuing the application of the brakes after impact in the event that the bumper mechanism should be able to return to its original position. Consequently, there is never complete assurance of continued prevention of vehicle movement after the impact has occurred. Moreover, the prior designs are not adapted for operation by a person stationed at the rearward end of the vehicle as it moves, which means that the earlier systems are not operable until the obstruction has been engaged. Generally, the vehicle protection systems of the prior art have not been suitable for locations at the forward or upper portions of a vehicle to prevent damage, for example, from engagement with an overhanging roof or a loading ramp.

SUMMARY OF THE INVENTION

The present invention provides an improved vehicle safety system which avoids the shortcomings of the prior art and includes other advantages. The system may include a linkage positioned at the rearward end of a dump truck with an impact member for moving the linkage to cause the brakes to be applied when an obstruction is encountered. Included is a means for automatic retraction of the linkage as the bed of the truck tilts when the load is to be dumped. The mechanism is generally in the form of a parallelogram linkage and retracts sufficiently to provide increased clearance at the rearward end of the truck as the bed is tilted.

The electrical circuit for the safety device may include a latching relay which will maintain the circuit to the solenoid for holding the brakes in a locked condition even if the bumper element should return to its original position. Thus, once an obstruction is encountered the brakes remain locked and can only be released be de-energizing the circuit through overt action.

Various bumper mounting arrangements are provided which allow the system to be utilized at various portions of the vehicle to prevent damage from different kinds of obstructions that may be encountered. In one embodiment, no bumper element of any kind is used and instead there is provided a normally closed switch positioned at the rearward end of the vehicle. This switch is in series with a source of power which causes energization of a brake-actuating solenoid whenever the vehicle is put in reverse gear. This means that as soon as the vehicle is shifted into reverse the brakes are locked. It can be driven rearwardly only when a man is positioned at the rearward end of a vehicle to hold the switch open, thereby de-energizing the solenoid and releasing the brakes. Any kind of release of the switch again energizes the system to lock the brakes. In this way the brakes may be locked from a remote position in advance of any impact.

BRIEF DESCRIPTION OF THE DRAWINGS

FIG. 4 is a diagram of the electrical circuit for the system;

FIG. 5 is a wiring diagram of an alternate circuit;

FIG. 9 shows a further modification of the bumper mounting; and

DESCRIPTION OF THE PREFERRED EMBODIMENT

Figure 2:
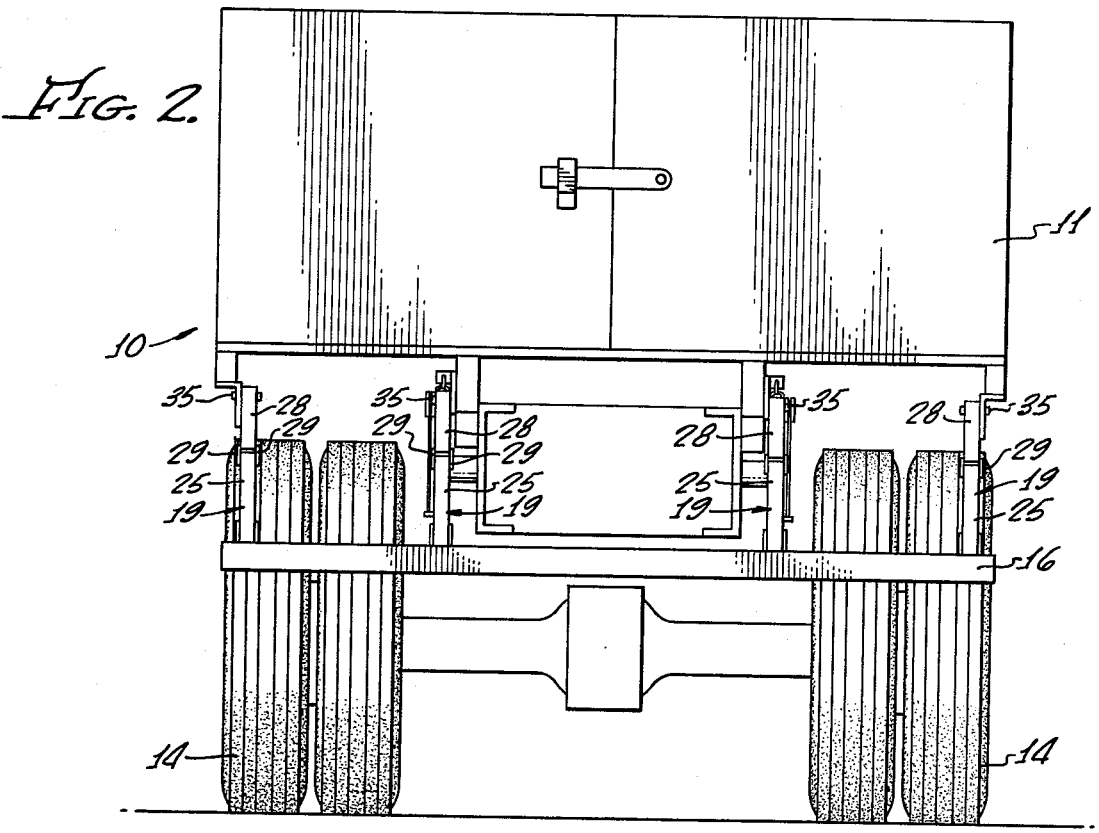
FIG. 2 is an end elevational view of the vehicle.
Figure 1:
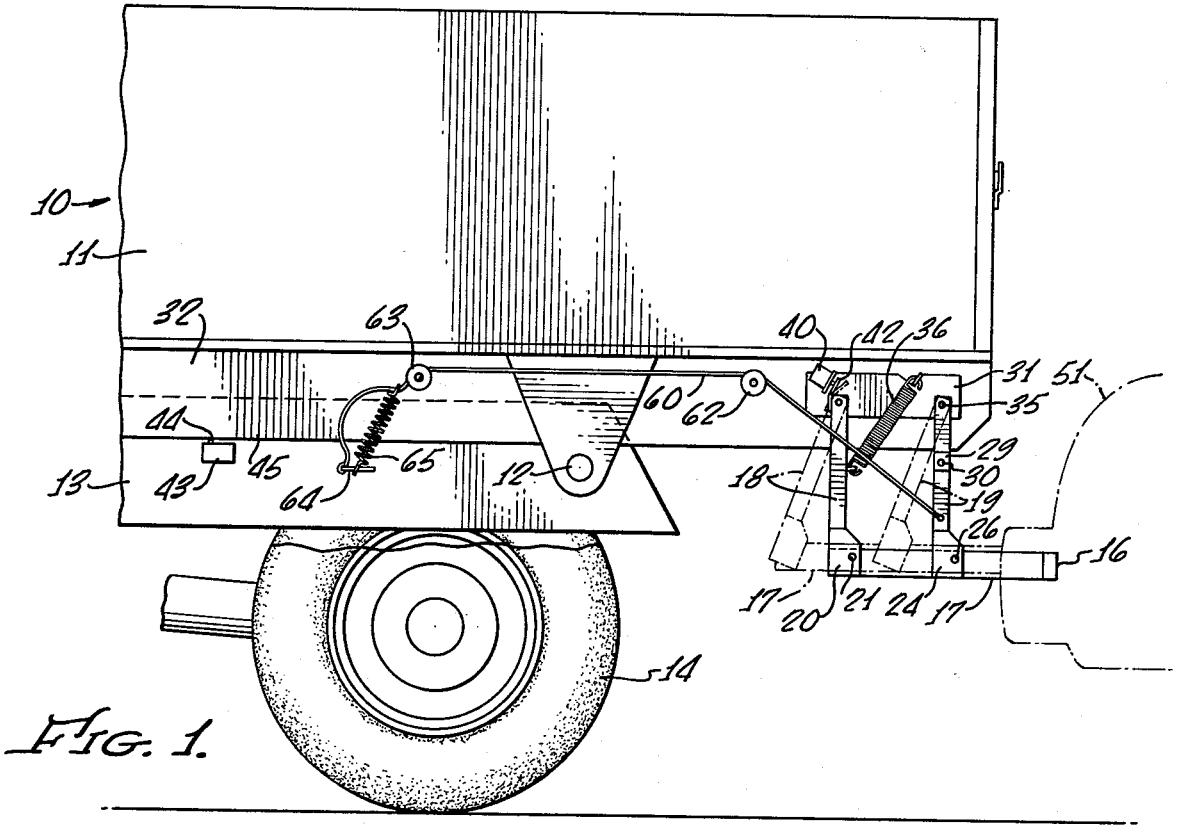
FIG. 1 is a fragmentary side elevational view of a vehicle utilizing the safety arrangement of this invention.
Figure 3:
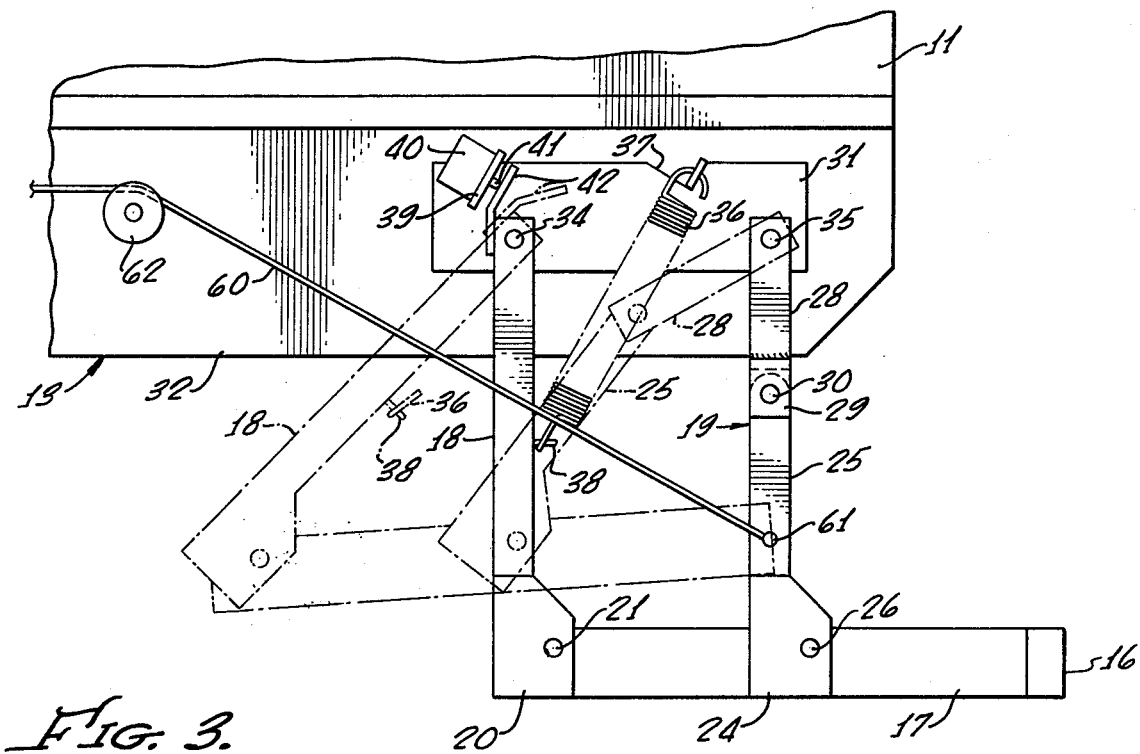
FIG. 3 is an enlarged fragmentary side elevational view of the bumper mechanism.

As shown in FIGS. 1, 2 and 3, the system of this invention is associated with the rearward portion of a dump truck 10 where it is used to prevent damage during backing of the truck. The truck 10 includes a bed 11, pivotal relative to the chassis 13, about shafts 12 which are located immediately behind the rear wheels 14. The system of this invention includes a transverse bumper 16 positioned beneath and immediately behind the bed 11 of the truck where it is carried by two parallel beams 17 extending longitudinally of the truck 10. Forwardly of the bumper 16, on either side of the truck 10, are two spaced parallel normally vertical support links 18 and 19. Each link 18 is at the forward end of one of the beams 17 and includes parallel webs 20 welded to its bottom end that receive the beam 17 and are connected to it by a pivot pin 21.

Similarly, at the bottom end of each link 19, webs 24 are welded to a flat rod 25 that forms the lower portion of this link and straddle the beam 17. A pivot pin 26 connects the webs 24 to the beam 17.

The link 19 includes a relatively short upper portion made up of a flat rod 28 to the lower end of which are welded webs 29. The latter elements fit over the upper end of the flat rod 25 to which they are connected by a pivot pin 30. Thus, the two principal parts of the link 19 may pivot relative to each other.

A flat plate 31 is welded, or otherwise suitably secured, to the horizontal side rail 32 on either side of the truck bed 11 serving as the means to attach the bumper and the support links to the truck. Pivot pins 34 and 35 connect the upper ends of the links 18 and 19, respectively, to the plate 31. One end of a tension spring 36 is anchored at a notch 37 in the upper edge of the plate 31, from which it extends downwardly and forwardly at an angle to engage an eyebolt 38 extending through the forward link 18. This maintains the linkage normally in the position shown in solid lines in FIGS. 1 and 3, with the links 18 and 19 in the vertical position, the beam 17 horizontal and the bumper element 16 positioned outwardly beyond the rearward end of the truck.

Projecting outwardly from the flat plate 31 on at least one side of the vehicle is a bracket 39 which mounts a switch 40. The bracket 39 is at an angle relative to the horizontal and positions the plunger 41 of the switch 40 normally in engagement with an angled tab 42 extending from the upper end of the forward link 18. The tab 42 has a downwardly bent lower part which is welded to the forward upper edge portion of the link 18. Accordingly, the tab 42 will move with the link 18 upon rotation of that member about the pivot pin 34. Forward rotation of the link 18 (clockwise as shown in FIGS. 1 and 3) will cause the tab 42 to move away from the plunger 41 of the switch 40.

The system includes an additional switch 43 mounted on the chassis 13 of the vehicle, with its plunger 44 forcing upwardly. The lower surface 45 of the bed 11 of the truck engages the plunger 44 when the bed is in its normal lowered position.

The switches 40 and 43 are incorporated in an electrical circuit shown in FIG. 4. In this circuit the switches 40 and 43 may be connected into the existing back-up light circuit of the vehicle or a special circuit of this type may be provided. The back-up light circuit includes, in series, the ignition switch 46 and a switch 47 which is closed when the transmission of the vehicle is placed in reverse gear, such as by manipulation of gear shift lever 47a. When the ignition is on and the vehicle is in reverse, current will flow through the back-up light 48 causing its illumination.

The switches 40 and 43 are connected to the back-up light circuit so as to be in parallel with the back-up light 48. These two switches are in series with each other. Beyond and in series with the switches 40 and 43 is a solenoid 49 connected to a brake actuator 50. The solenoid and brake actuator are constructed such that when the solenoid 49 is energized, the brake actuator 50 applies the brakes of the vehicle causing it to stop. The actuator 50, in a pneumatic brake system, is a valve operated by the solenoid 49 to direct pressurized air to the brakes.

The switch 43 is normally open, but is held closed when the truck bed 11 is in the lowered position. The switch 40 is normally closed, but is held open by the tab 42 at the upper end of the forward link 18. Accordingly, under ordinary conditions, when the ignition is on and the transmission is in reverse, the switches 43, 44 and 45 are closed, but the switch 40 is open. Therefore, no current flows to the solenoid 49 and it has no influence on the braking system of the vehicle. However, if an obstruction, such as a parked vehicle 51, should be encountered by the bumper 16, the switch 40 will be closed and the brakes applied to stop the vehicle before it can do damage to the obstruction or to the backing vehicle.

This comes about through the movement of the linkage to the phantom line position of FIGS. 1 and 3. With the bumper 16 stopped by the obstruction 51, it causes the horizontal beams 17 to move forwardly relative to the vehicle during the next increment of rearward movement of the vehicle. The links 18 and 19 pivot forwardly as this occurs. Such movement of one of the links 18 causes the tab 42 at its upper end to move away from the plunger 41 of the switch 40. When this occurs, the switch 40 assumes its normally closed position, as a result of which the solenoid 49 is energized and the brake actuator 50 is caused to apply the brakes instantly. The vehicle then stops at once without allowing any damage to be incurred. The brakes remain locked until the transmission has been shifted out of reverse or the ignition is shut off, which will de-energize the solenoid 49.

If desired, a warning light 52 may be included in the brake actuating circuit, beyond the switches 40 and 43, to provide the driver with a visual indication when the system has been activated.

The brake actuating circuit also may be connected to the neutral safety switch 53 of the engine starting circuit. This switch will be closed when the transmission is in neutral, irrespective of whether or not the engine has been started. When the brake actuating circuit is connected in series with the switch 53, it can protect against a runaway vehicle left in neutral gear. The truck's brakes will be applied to bring it to a stop as soon as the bumper 16 encounters an obstruction. Diodes 54 and 55 are included when the brake actuator is wired to the switch 53, to prevent reverse current flow.

When the truck bed 11 is tilted in dumping the load, rearward movement of the truck may be necessary. For this reason, the switch 43 opens when the bed tilts, de-energizing the circuit of the emergency braking system.

The alternative circuit for actuating the brakes shown in FIG. 5 utilizes a latching relay as well as the switches in controlling the flow of current to the solenoid that operates the brake actuator. As shown in this circuit, the latching relay 57 is connected to the lead 58 from the back-up light circuit, ahead of and in series with both the solenoid 49 and the switches 40 and 43. Accordingly, if the bumper linkage causes the impact switch 40 to be closed, current will flow through the latching relay 57, causing it to shift its position and direct current to the solenoid 49 to operate the brake actuator 50 for locking the wheels of the vehicle. The latching relay 57 will maintain this position even if the switch 40 becomes opened again. There is complete assurance, therefore, that when the brakes of the vehicle have been applied no inadvertent release can take place. Only the interruption of power to the latching relay from the input lead 58 will cause power to be removed from the solenoid 49 and release of the brake actuator 50. Opening of the impact switch 40 will not interrupt the flow of current to the brake actuator.

The brake actuating mechanism is retracted when the bed of the truck is tilted so that it does not interfere with movement of the tilting bed and does not become damaged as the bed is rotated. This is necessary because the rearward end of the truck bed moves downwardly as the bed pivots about the pivot shafts 12 and the brake actuating mechanism would strike the supporting surface 59 beneath the vehicle or the rearward wheels 14 if left in its original position. Retraction of the brake actuating mechanism is very simply accomplished by a cable 60 on either side of the vehicle, attached by a pin 61 to the lower end portion of the rearward link 19, from where it extends forwardly and upwardly. The cable 60 passes around a pulley 62 mounted on the side structure 32 of the truck bed then, going horizontally forward to a second pulley 63. From the latter pulley, which is ahead of the pivot shaft 12 of the bed 11, the cable extends downwardly to an attaching element 64. This secures the cable to the chassis 13 beneath and slightly forwardly of the pulley 63. A tension spring 65 has a lower end anchored by the element 64 and its other end 66 connected to the cable 60 adjacent the pulley 63. The force of the spring 65 normally provides slack in the cable 60 between the point of its attachment to the cable 5 and the end connection 64 for the cable. The length of the cable 60 between the upper spring end 66 and the attaching point 64 is approximately one and one-half times the length of the spring.

Figure 6:
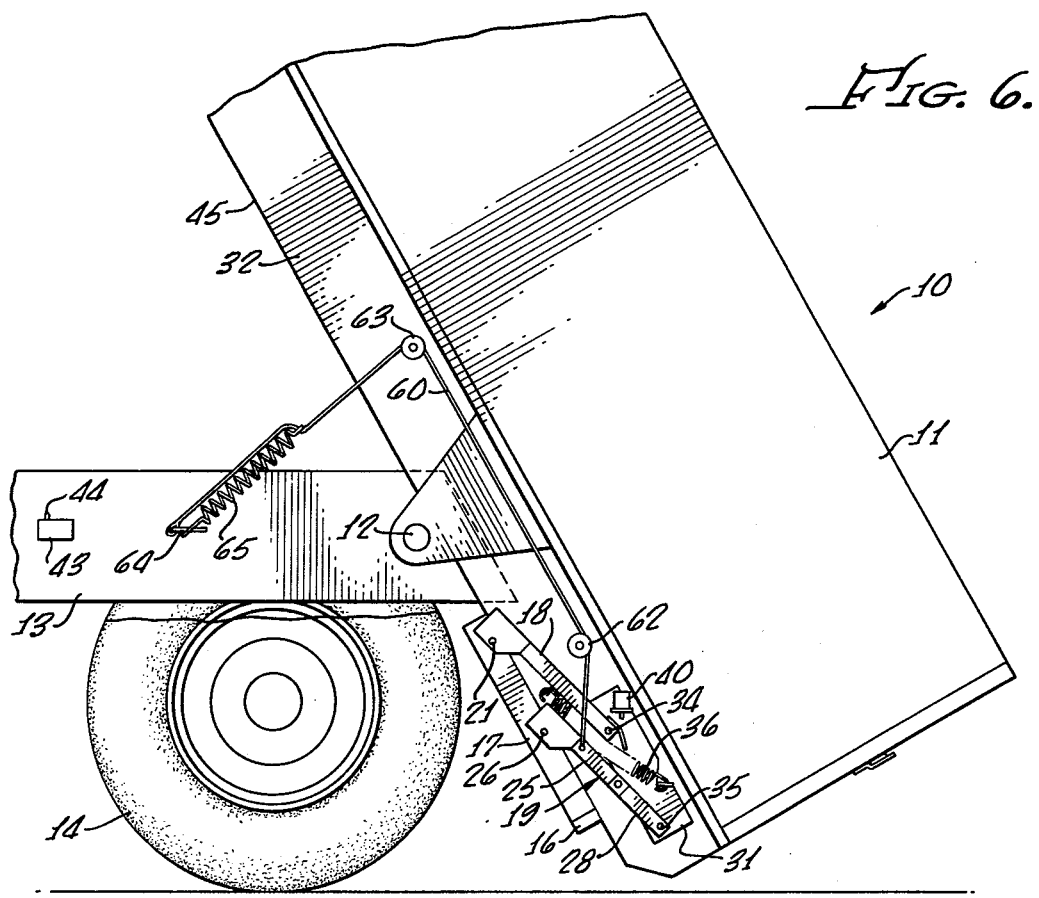
FIG. 6 is a fragmentary side elevational view of the vehicle with the bed in the tilted position.

When the bed of the truck is tilted, as shown in FIG. 6, the end of the cable 60 attached by the element 64 remains fixed. The pulley 63, being forward of the shaft 12, moves upwardly away from the fixed cable end. As a result, the cable 60 pulls on the link 19, thereby rotating the entire bumper mechanism forwardly and upwardly. This retracts the bumper mechanism so that it is inward of the rearward end of the vehicle and moved upwardly to a position adjacent the bottom of the bed 11 of the truck. In this position it is out of the way and does not interfere with the rotation of the truck bed as it is tilted for dumping.

With the rearward link 19 made of two sections pivotally connected together by the pin 30, there will be relative rotation of these two sections as soon as there is a pull from the cable 60. The result is an immediate raising of the outwardly extending bumper portion 16, assuring clearance beneath the bumper as soon as the bed of the truck is tilted. It is possible, however, to construct the rearward link 19 as a solid element comparable to the front link 18, which is satisfactory for many installations.

When the bed of the truck is lowered the mechanism returns to its original position as the pull on the cable 60 is released and the spring 36 pulls the link 18 rearwardly and downwardly. The spring 38 then maintains the linkage in the solid line position of FIGS. 1 and 3, preventing it from experiencing unwanted movement during operation of the vehicle. Of course, when the bumper 16 encounters an obstruction the spring 38 readily yields in allowing the displacement of the bumper for closing the impact switch 40.

The spring 65 acts as a safety device allowing extra movement of the cable 60 in the event some object should become lodged between the bumper 16 and the bed 11 of the truck. The spring 65 also can accommodate variations in the installation position of the cable as may be required for different vehicles.

Figure 7:
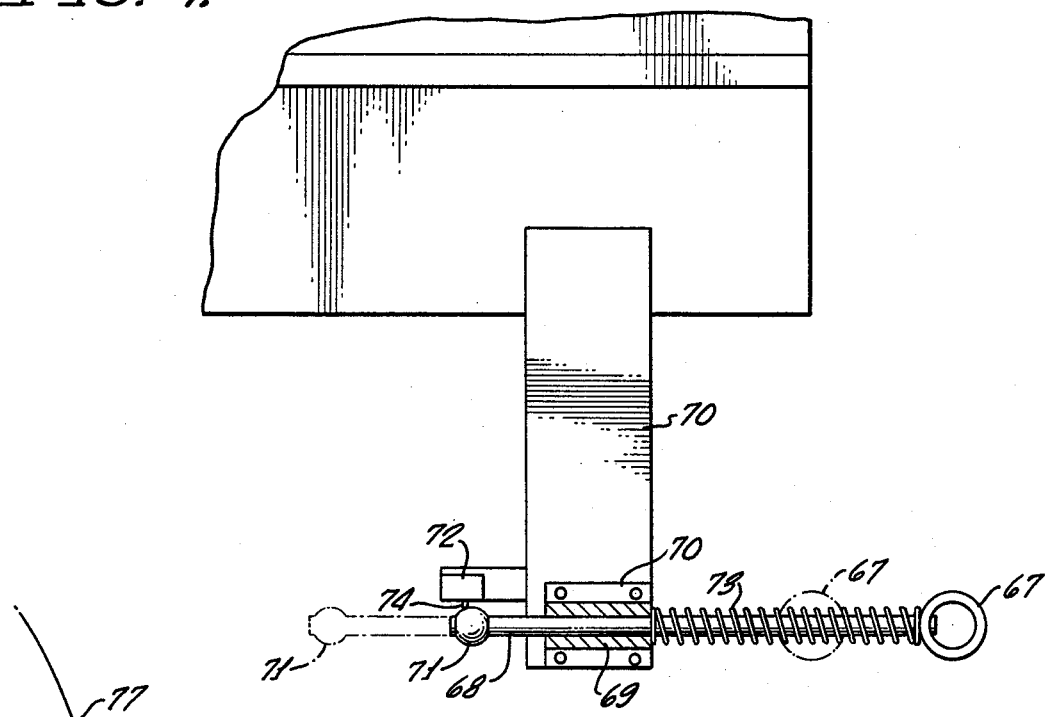
FIG. 7 is a fragmentary view of an alternate bumper construction.

FIG. 7 illustrates a bumper arrangement which may be used at different locations on a vehicle or which may be positioned at the rearward end of a vehicle where retraction is not required. In this version, there is a bumper element 67 mounted on a rod 68 that extends through a sleeve 69 attached by a bracket 70 to the vehicle. Beyond the sleeve 69 a cam 71 is carried by the rod 68 adjacent to a normally open switch 72 which is wired into the brake actuating mechanism at the same location as the switch 40 described above. A compression spring 73 circumscribing the rod 68 between the bumper element 67 and the sleeve 69 maintains the bumper element in a normally extended position. However, when the bumper element 67 engages an obstruction it is pushed inwardly against the force of the spring 73. This moves the rod 68 linearly so that the cam 71 moves the actuator 74 of the switch 72, thereby closing the switch 72. This, in turn, energizes the solenoid 49 that causes the brake actuator 50 to apply the brakes. It is preferred to use the latching relay 57 with the arrangement of FIG. 7 because the cam 71 may pass by the switch actuator 74, thereby releasing the switch plunger 74 as the rod 68 is moved inwardly, or may be returned to its original position by the spring 73 to also release the plunger. With the latching relay in the circuit the brakes will remain applied.

Figure 8:
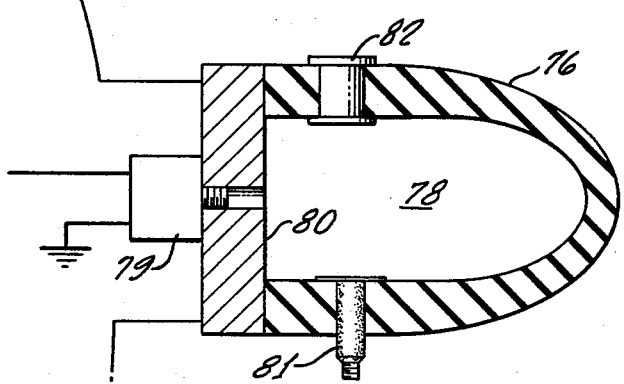
FIG. 8 is a sectional view of a bumper that provides an enclosed chamber in a pressure-operated device.

In the embodiment of FIG. 8, the bumper 76 replaces the conventional bumper at the forward or rearward end of a vehicle 77. The bumper 76 is constructed of a flexible material such as Butyl rubber defining a hollow chamber 78 within it. A switch 79 is located on the rigid inner plate 80 to which the ends of the bumper are connected. The switch 79 is a normally open pressure-operated switch, responsive to the increases in pressure within the chamber 78. The switch 79 is connected in a circuit comparable to that of FIG. 4 or FIG. 5 (without the tilt switch 43), replacing the switch 40 of that circuit. Normally, pressure is maintained in the chamber 78 to assure that the bumper maintains its shape. This pressure is less than that required to close the switch 79. However, when an obstruction is encountered, the bumper is compressed, raising the pressure within the chamber 78 sufficiently to cause the switch 79 to close, thereby to actuate the brakes as described above. In the event of loss of air from the chamber 78, it can be pressurized through a valve 81, similar to a tire valve. A relief valve 82 protects against damage from overpressurization as might otherwise occur from a severe impact.

In the arrangement of FIG. 9, the bumper is mounted on a deflectable element which bends under impact to complete the circuit to the brake actuating solenoid. In this construction the bumper 83 is mounted on a rod 84 that is supported by brackets 85 and 86 by insulating grommets 87 and 88 through which it extends. A plate 89 carries the brackets 85 and 86 and provides a means for attachment to the vehicle. Between the brackets 85 and 86 is an additional bracket 90 carrying an annular conductor 91 which is of larger internal diameter than the external diameter of the rod 84. When the bumper 83 encounters an obstruction, the rod 84 bends as a column, causing its central portion to move to one side to engage the conductor 91. The rod 84 and conductor 91 are wired into the circuit of the brake-actuating solenoid such that this completes the circuit to the solenoid, thereby applying the brakes.

The rod 84 preferably is made in two sections 92 and 93 interconnected by a stiff compression spring 94. In the event of a severe impact the spring 94 will deflect to prevent damage to the bumper assembly.

Figure 10:
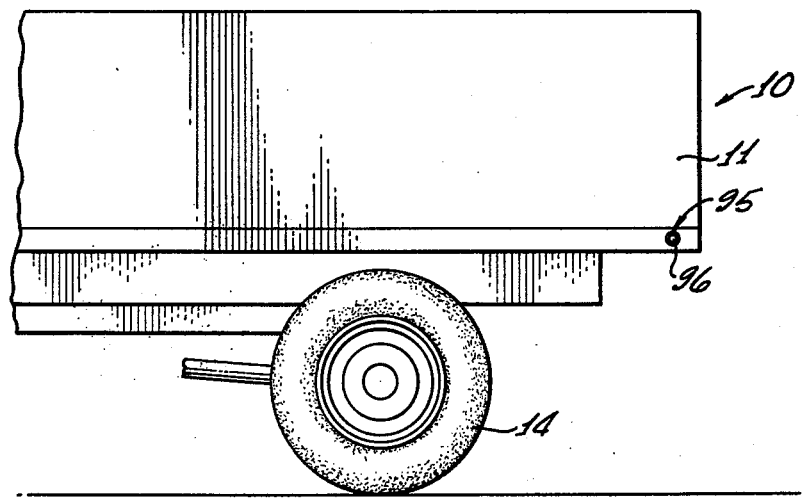
FIG. 10 is a side elevational view of a safety system operable from the exterior of the vehicle.

In some instances it is preferred to use no bumper element at all and to assure that the vehicle can be backed up only when a man is stationed at the rearward end of the truck to observe its movement as it backs. This arrangement is shown in FIG. 10 in which there is a switch 95 in series with the ignition switch 46 and the transmission reverse switch 47, as well as the brake actuating solenoid 49. The switch 43 also is included in the event that the vehicle is a dump truck, but is omitted otherwise. The switch 95 is normally closed so that when the ignition switch is on and the truck is placed in reverse gear the circuit is complete to the solenoid 49, thereby locking the brakes and preventing reverse movement.

The switch 95 is located at the rearward end of the vehicle and can be opened by having its plunger 96 depressed by a man stationed at that location. Thus, it requires two men to back the vehicle with one walking beside it holding the plunger 96 depressed so as to open the switch 95 and de-energize the solenoid 49 to release the brakes. In the event that an obstruction is observed at the rearward end of the vehicle, the plunger 96 merely is released to close the switch 92, instantly locking the brakes and avoiding damage or injury. The vehicle can be stopped before it even reaches the obstruction. The system is a fail-safe one because if the man should happen to stumble and fall or to release the plunger 96 for any other reason, the switch 95 will close and stop the vehicle.

In lieu of being normally closed, the switch 95 may be normally open, in which event the plunger 96 is depressed to complete the circuit to the solenoid 49 for applying the brakes. This lacks the fail-safe feature of the system utilizing a normally closed switch, but makes backing the vehicle a simpler operation.

The brake actuating arrangements described above may be controlled by fluid systems rather than the electrical systems shown. Fluid controls can perform all of the functions of the electrical controls and in some instances may be preferred. Pneumatic controls are particularly attractive in view of the source of compressed air normally existing on trucks, with an adequate oversupply for controlling the braking system of this invention. Hydraulic controls also are feasible. A latching means may be incorporated in any of the systems set forth, whether electrical or fluid controls are used. The same holds true for the correlation of the control with the gear selector of the vehicle.

The foregoing detailed description is to be clearly understood as given by way of illustration and example only, the spirit and scope of this invention being limited solely by the appended claims.

We claim:

1. In combination with a vehicle having a chassis, a body, and pivot means pivotally connecting said body to said chassis for dumping a load in said body by movement of the rearward portion of said body downwardly and the forward portion of said body upwardly, said vehicle having brakes, a safety device for said vehicle comprising
  a bumper assembly including an impact member adapted to engage an obstruction, and link means pivotally connecting said impact member to said body,
  means responsive to engagement of said impact member with an obstruction for applying said brakes, and means for retracting said bumper assembly upon said movement of said body,
    said retracting means including cable means attached to said bumper assembly and to said chassis for pulling upwardly relative to said body on said assembly upon said movement of said body.

2. A device as recited in claim 1 in which said cable means includes
  a flexible cable connected to said assembly,
  and guide means for said flexible cable, said guide means including a portion directing said flexible cable between said forward portion of said body and a portion of said chassis forwardly of said pivot means, whereby upon said upward movement of said forward portion of said body, said cable is caused to exert a pull on said assembly.

3. A device as recited in claim 2 in which said guide means directs said cable upwardly from said assembly to said rearward portion of said body, forwardly to said forward portion of said body, and downwardly from said forward portion of said body to said chassis.

4. A device as recited in claim 3 including resilient means for allowing limited elongation of said flexible cable.

5. A device as recited in claim 4 in which said resilient means is a tension spring one end of which is attached to said flexible cable and the other end of which is attached to said chassis.

6. A device as recited in claim 1 in which said means responsive to engagement of said impact member with an obstruction includes a switch having operating means movable by said link means.

7. A device as recited in claim 1 in which said link means includes at least one forward link and one rearward link pivotally connected to said body and depending therefrom, said forward and rearward links carrying said bumper assembly.

8. A device as recited in claim 7 in which said bumper assembly includes an impact member transversely of said vehicle, and at least one member longitudinally of said vehicle, said forward and rearward links having lower ends pivotally connected to said member longitudinally of said vehicle.

9. A device as recited in claim 8 in which said rearward link includes two sections, and means interconnecting said two sections for enabling said rearward link to fold upwardly upon said retraction of said bumper assembly.

10. A device as recited in claim 9 in which said cable means is attached to said rearward link.

11. A device as recited in claim 10 including spring means attached to said forward link for normally maintaining said bumper assembly in an extended position.

12. In a vehicle having a chassis, a braking system, gear selector means for selecting the mode of motion for said vehicle, and a body pivotally mounted to said chassis for pivotal movement relative to said chassis, said body including a rearward end portion projecting rearwardly from said chassis, said rearward end portion being movable downwardly as said body pivotally moves upon said chassis, a bumper device comprising
  an impact member, means for mounting said impact member on said body for motion between an extended operative position in which said impact member may engage an obstacle and a retracted inoperative position in which said impact member clears said vehicle as said body so moves relative to said chassis, said means for mounting said impact member on said body comprising linkage means pivotally connected between said impact member and said rearward portion of said body and depending downwardly therefrom,
  resilient means for urging said linkage means to a position where said impact member is in said extended operative position,
  means responsive to movement of said body relative to said chassis for moving said impact member from said extended to said retracted position thereof,
  said means for moving said impact member to said retracted position comprising cable means engaged with said linkage means and connected to said chassis for moving said linkage means so that said linkage means causes said impact member to move to said retracted inoperative position in response to pivotal motion of said body upon said chassis,
  a brake actuator responsive to an energizing signal for operating said system, control means having a first unoperated state and a second operated state in which an energizing signal is fed to said brake actuator, means responsive to said gear selector means for enabling said control means when a predetermined direction of motion of the vehicle is selected, bumper switch means responsive to impact of said bumper with an obstacle for driving said control means from said unoperated to said operated state whereby said braking system will be operated upon impact of said bumper with an obstacle when said vehicle is moving in a selected direction, and means for causing said braking system to remain energized after termination of said impact.

13. In a vehicle having a chassis and a body movable relative to said chassis, a bumper device comprising an impact member, means for mounting said impact member on said body for motion between an extended operative position in which said impact member may engage an obstacle and a retracted inoperative position in which said impact member clears said vehicle as said body so moves relative to said chassis, said means for mounting said impact member on said body comprising linkage means interconnecting said body and said impact member, and resilient means interconnected between said body and said linkage means for biasing said linkage means toward a position in which said impact member is in said extended operative position, and means responsive to movement of said body relative to said chassis for moving said impact member from said extended to said retracted position thereof.

14. In a vehicle having a chassis and a body pivotally mounted to said chassis, said body including a rearward end portion projecting rearwardly from said chassis, said rearward end portion being movable downwardly as said body pivotally moves on said chassis, a bumper device comprising an impact member, means for mounting said impact member on said body for motion between an extended operative position in which said impact member may engage an obstacle and a retracted inoperative position in which said impact member clears said vehicle as said body so moves relative to said chassis, said means for mounting said impact member on said body comprising linkage means pivotally connected between said impact member and said rearward portion of said body and depending downwardly therefrom, resilient means for urging said linkage means to a position where said impact member is in said extended operative position for maintaining said impact member in said extended operative position, and means for moving said impact member to said retracted position comprising cable means engaged with said linkage means and connected to said chassis for moving said linkage means so that said linkage means causes said impact member to move to said retracted inoperative position in response to pivotal motion of said body upon said chassis.

* * * * *